United States Patent [19]
Wiggins et al.

[11] Patent Number: 5,877,245
[45] Date of Patent: Mar. 2, 1999

[54] CROSS-LINKED REACTION PRODUCTS OF ALKOXYLATED ALCOHOLS AND ALKYLENE GLYCOLS

[75] Inventors: Michael S. Wiggins, Lansdale; David I. Devore, Langhorne, both of Pa.

[73] Assignee: Henkel Corporation, Plymouth Meeting, Pa.

[21] Appl. No.: 911,795

[22] Filed: Aug. 15, 1997

Related U.S. Application Data

[60] Provisional application No. 60/049,338, Jun. 10, 1997.
[51] Int. Cl.$^6$ .............................. C08K 5/00; C08K 5/06
[52] U.S. Cl. ...................... 524/366; 524/366; 524/376; 524/377; 524/378; 568/618; 568/619; 568/620; 568/622; 568/623; 568/624; 568/625
[58] Field of Search .................................... 524/366, 376, 524/377, 378; 568/618, 619, 620, 622, 623, 624, 625

[56] References Cited

U.S. PATENT DOCUMENTS

| | | | |
|---|---|---|---|
| 2,481,278 | 9/1949 | Ballard et al. | 260/615 |
| 3,770,684 | 11/1973 | Singer et al. | 260/29.7 |
| 4,079,028 | 3/1978 | Emmons et al. | 260/29.6 |
| 4,426,485 | 1/1984 | Hoy et al. | 524/591 |
| 4,855,403 | 8/1989 | Meschke et al. | 528/419 |

OTHER PUBLICATIONS

Database WPIDS, London: Derwent Publications Ltd., AN 92–209431, EP 491232 A1, (BADI) BASF AG, "High mol. wt. polyether ol(s)–obtd. by reaction of cpds. contg. active hydrogen atoms, epoxide(s), etc.", abstract, 24 Jun. 1992, vol. 26, see the entire abstract.

*Primary Examiner*—Frederick Krass
*Attorney, Agent, or Firm*—Wayne C. Jaeschke; John E. Drach; Henry E. Millson, Jr.

[57] ABSTRACT

The reaction product of

A) a linking compound of formula I $$R^1(X)_3 \qquad (I)$$

wherein each X group is a halogen or one X group is a halogen and two X groups with 2 carbon atoms from the $R^1$ group and an oxygen atom form an epoxy group, and $R^1$ is an alkanetriyl group containing from 3 to 10 carbon atoms;

B) a compound of formula II $$R^2(OA)_n\text{—OH} \qquad (II)$$

wherein $R^2$ is an aliphatic group containing from 4 to 36 carbon atoms, n is a number of from 1 to 200, and each OA group is independently an ethyleneoxy, 1,2-propyleneoxy, or 1,2-butyleneoxy group; and C) a compound of formula III $$\text{H—(OA)}_m\text{—OH} \qquad (III)$$

wherein OA is as defined above, and m is a number of from 1 to 500;

processes for its preparation; and methods for its use as a thickener in aqueous compositions.

36 Claims, No Drawings

CROSS-LINKED REACTION PRODUCTS OF ALKOXYLATED ALCOHOLS AND ALKYLENE GLYCOLS

This application claims priority from U.S. provisional application Ser. No. 60/049,338, filed Jun. 10, 1997.

1. FIELD OF THE INVENTION

This invention relates to polymeric compounds useful as thickeners for aqueous compositions, especially hydrophilic emulsion polymer latexes.

2. BACKGROUND OF THE INVENTION

Thickeners for aqueous systems are often required to obtain the rheological properties needed for various applications. Such aqueous-based systems include latex paints, printing inks, protective coatings for paper and metal, and the like. Known thickeners include natural polymers such as casein and alginates, and synthetic mateials such as certain cellulose derivatives, acrylic polymers, and polyurethane polymers.

SUMMARY OF THE INVENTION

The present invention relates to compounds useful as thickening agents for aqueous compositions, especially hydrophilic latex paints, to aqueous dispersions or solutions containing the compounds, to methods for their preparation, and to aqueous compositions containing these compounds.

The compounds of the invention are the reaction products of

A) a linking compound of formula I $$R^1(X)_3 \qquad (I)$$

wherein each X group is a halogen atom or one X group is a halogen atom and two X groups with two carbon atoms in the $R^1$ group and an oxygen atom form an epoxy group, and $R^1$ is an alkanetriyl group containing from 3 to 10 carbon atoms;

B) a compound of formula II $$R^2(OA)_n OH \qquad (II)$$

wherein $R^2$ is an aliphatic group containing from 4 to 36 carbon atoms, n is a number of from 1 to 200, and each OA group is independently an ethyleneoxy, 1,2-propyleneoxy, or 1,2-butyleneoxy group; and C) a compound of formula III $$H(OA)_m\text{—}OH \qquad (III)$$

wherein OA is as defined above, and m is a number of from 1 to 500;

wherein the ratio of moles of component A) to the sum of the OH equivalents in components B) plus C) is from 0.7:1 to 0.99:1.

DETAILED DESCRIPTION OF THE INVENTION

Other than in the operating examples, or where otherwise indicated, all numbers expressing quantities of ingredients or reaction conditions used herein are to be understood as modified in all instances by the term "about".

As stated above, this invention relates to compounds and aqueous solutions or dispersions thereof useful as thickening agents for aqueous compositions, especially hydrophilic latex paints, wherein the compounds of the invention are the reaction products of A) a linking compound of formula I $$R^1(X)_3 \qquad (I)$$

wherein each X group is a halogen atom or one X group is a halogen atom and two X groups with two carbon atoms in the $R^1$ group and an oxygen atom form an epoxy group, and $R^1$ is an alkanetriyl group containing from 3 to 10 carbon atoms;

B) a compound of formula II $$R^2(OA)_n OH \qquad (II)$$

wherein $R^2$ is an aliphatic group containing from 4 to 36 carbon atoms, n is a number of from 1 to 200, and each OA group is independently an ethyleneoxy, 1,2-propyleneoxy, or 1,2-butyleneoxy group; and C) a compound of formula III $$H(OA)_m\text{—}OH \qquad (III)$$

wherein OA is as defined above, and m is a number of from 1 to 500;

wherein the ratio of moles of component A) to the sum of the OH equivalents in components B) plus C) is from 0.7:1 to 0.99:1, and preferably from 0.7:1 to 0.9:1, and more preferably from 0.8:1 to 0.9:1.

The linking compound of formula I is preferably epichlorohydrin although other epihalohydrins can also be used. Also, trihaloalkanes can be used, such as 1,2,3-trichloropropane, 1,2,4-trichlorobutane, 1,3,6-trichlorohexane, and the like. Instead of chlorine in the epihalohydrins and the trihaloalkanes, the corresponding bromine and iodine compounds can also be used, including compounds containing two or even all three of the above halogens.

The compound of formula II is an aliphatic alkoxylated alcohol. The $R^2$ group in formula II is preferably a straight or branched chain alkyl group containing from 12 to 20 carbon atoms, more preferably from 16 to 20 carbon atoms, and most preferably is a $C_{20}$ Guerbet alkyl group. However, the $R^2$ group can also be a linear or branched alkenyl or alkynyl group, a saturated carbocyclic moiety, an unsaturated carbocyclic moiety having one or more multiple bonds, a saturated heterocyclic moiety, or an unsaturated heterocyclic moiety having one or more multiple bonds. The number of alkoxy groups, i.e. the value for n in formula II, is preferably from 80 to 120, and more preferably from 80 to 100. The OA groups are preferably all ethyleneoxy groups.

The compound of formula III is a polyalkylene glycol in which the OA groups are as defined above for the compounds of formula II. The OA groups are preferably all ethyleneoxy groups. The value for m in formula III is preferably a number from 50 to 500.

With respect to components A), B) and C), one or more of these components can be a mixture of compounds falling within the respective formulas therefor.

It is critical for the compounds of the invention that the ratio of moles of component A) to the sum of the OH equivalents in components B) plus C) be in the range of 0.7:1 to 0.99:1 since a ratio of 1:1 or greater will result in the formation of an aqueous gel rather than an aqueous solution which is required for use as a thickening agent for aqueous compositions such as latex paints. Conversely, a ratio of less than 0.7:1 will result in less branching and accordingly less effective thickening activity per unit weight of active compound. The compounds of the invention are designed to be branched compounds, whereas prior to the present invention it was believed that branching would be detrimental to the performance of thickeners for latex paints.

The molar ratios of components used to prepare the present compounds can be selected from the following ranges:

Component A):component B):component C)=(0.5 to 1):1:(0.1 to 1), provided that the ratio of moles of A) to the sum of the OH equivalents in B) plus C) must be in the range of from 0.7:1 to 0.99:1. Also, the degree of branching can be further increased as desired by increasing the ratio of component B) to component C) in the reaction product.

The compounds of the invention are preferably prepared in aqueous solution. These aqueous solutions typically contain from 15 to 40% by weight of solids, preferably from 20 to 40% by weight of solids. In addition, these aqueous solutions can also contain from 1 to 30% by weight of a water-miscible cosolvent, which acts as a viscosity modifier. Suitable cosolvents include liquid polyols, liquid ethoxylated and/or propoxylated $C_{1-8}$ alcohols, or liquid ethoxylated and/or propoxylated $C_{1-8}$ carboxylic acids. A liquid polyol is any compound having two or more —OH groups which is a liquid at room temperature, examples of which include but are not limited to ethylene glycol, 1,2-propylene glycol, 1,3-propylene glycol, and 1,2-butylene glycol. A liquid ethoxylated and/or propoxylated $C_{1-8}$ alcohol is any aliphatic alcohol ethoxylated and/or propoxylated to any degree of ethoxylation or propoxylation and which is a liquid. Compounds in which the —OH group of the liquid ethoxylated and/or propoxylated $C_{1-8}$ alcohol is etherified with a $C_{1-4}$ alkyl group are also included in this group. A liquid ethoxylated and/or propoxylated $C_{1-8}$ carboxylic acid is any aliphatic carboxylic acid ethoxylated and/or propoxylated to any degree of ethoxylation or propoxylation and which is a liquid. Preferred viscosity modifiers include butoxy triglycol (triethylene glycol monobutyl ether), butyl carbitol (diethylene glycol monobutyl ether), or 1,2-propylene glycol. Also preferred are combinations of butoxy triglycol, butyl carbitol, and 1,2-propylene glycol which total from 1% to 30% by weight of the total composition.

The process of the invention used to prepare the aqueous solutions containing the compounds of the invention is preferably carried out using the following steps:

I) components B) and C), i.e. the aliphatic alkoxylated alcohol and the polyalkylene glycol components, are reacted together in the presence of an organic solvent that will azeotrope water, e.g. benzene, toluene, or xylene and in the presence of from 1 to 1.5 equivalents, based on OH groups, of an alkali metal hydroxide, preferably aqueous concentrated sodium hydroxide, or an alkali or alkaline earth metal lower alkoxide, e.g. sodium methoxide, under reflux conditions, preferably at atmospheric pressure, to remove water of reaction and any water introduced with the alkali metal hydroxide through azeotropic distillation. The reflux temperature is of course dependent on the organic solvent used in this step. The reaction is continued until substantially all of the water in the reaction mixture is removed, e.g. to a residual water content of 0.2% by weight or less. The reaction mixture is then preferably cooled.

II) component A), i.e. the linking compound of formula I, is then added to the reaction mixture from step I) and reacted at a temperature of from 60° C. to the reflux temperature of the organic solvent, preferably at a temperature of from 100° to 110° C.

III) the organic solvent is then removed from the reaction mixture resulting from step II), preferably by vacuum distillation.

IV) water is then added to the reaction product from step III) to form an aqueous solution having a solids content of from 15 to 40% by weight, preferably from 20 to 40% by weight.

As discussed above, a cosolvent can then optionally be added to the aqueous solution.

The compounds of the invention and the aqueous solutions containing them are useful as thickeners for aqueous compositions, particularly for use in hydophilic emulsion polymer latexes. They can be added to aqueous compositions so that from 0.1 to 20% by weight of the compounds of the invention are present, based on the solids content of the aqueous composition.

There are a number of advantages for using the compounds of the invention. For example, smaller quantities of the present compounds are needed compared to conventional thickeners to achieve the desired degree of thickening of emulsion polymer latexes. In addition, the resulting thickened latexes have better flow, better leveling, better scrub, and better spatter resistance than cellulosic and polyacrylic thickeners. Moreover, the thickened latexes have better ageing stability than urethane associative thickeners.

The invention will be illustrated but not limited by the following examples.

EXAMPLES

Example 1

57 millimoles of tridecyl alcohol ethoxylate (100 mole average) and 19 millimoles of PEG-8000 were added to a one liter reactor. 300 grams of toluene were then added and the mixture was heated until it melted. 95 millimoles of 50% aqueous sodium hydroxide were added to the melt, and the mixture heated to reflux to drive off water. When the water level in the mixture was below 0.2%, 86 millimoles of epichlorohydrin were added. The reaction was then carried out at 90°–100° C. until epoxide titration showed the absence of oxirane groups. The toluene was distilled off under vacuum and the residue was diluted with 15% by weight of butyl carbitol as a viscosity reducing cosolvent, and sufficient water to produce a solution containing 40% polymer solids.

Comparative Example 1

The procedure of Example 1 was repeated except that 57 millimoles of epichlorohydrin, 400 grams of water, and 200 grams of butyl carbitol were used.

The products of the above examples were then tested in a 0.35 micron vinyl-acrylic hydrophilic latex water-based paint. The results are shown in TABLE I below.

TABLE I

| Example | Ratio[1] ECH/OH | Gms[2]/Pint Paint | ICI[3] | KU[4] |
| --- | --- | --- | --- | --- |
| 1 | 0.9 | 1.0 | 0.9 | 75 |
| 1 | 0.9 | 2.0 | 2.0 | 92 |
| Comp. 1 | 0.6 | 2.0 | 0.2 | <53 |
| Comp. 1 | 0.6 | 10.0 | 1.0 | 53 |

[1]ratio of moles of epichlorohydrin to the OH equivalents of tridecyl alcohol ethoxylate plus PEG-8000.
[2]grams of water/cosolvent/product mixture
[3]ICI is a viscosity measurement for paint to measure its brush drag. The measurement (poise units) is carried out on a cone and plate viscometer at a shear rate of 8,000–10,000 sec$^{-1}$.
[4]KU is a low shear viscosity measurement at 100 sec$^{-1}$ for paint to measure its stirrability in Krebs Units (KU).

Example 2

59.7 millimoles of cetyl/stearyl alcohol ethoxylate (100 mole ethoxy average) and 15 millimoles of PEG-8000 were added to a one liter reactor. 400 grams of toluene were then added and the mixture was heated until it melted. 90 millimoles of 50% aqueous sodium hydroxide were added and the mixture heated to reflux to drive off water. When the water level in the mixture was below 0.2%, 65.3 millimoles of epichlorohydrin were added. The reaction was then carried out at 90°–100° C. until epoxide titration showed the absence of oxirane groups. The toluene was distilled off under vacuum and the residue was diluted with 15% by weight of butyl carbitol as a viscosity reducing cosolvent, and sufficient water to produce a solution containing 30% polymer solids.

Examples 3–7

The process of Example 2 was repeated except that the quantities of components set forth in Table II were used in these examples.

TABLE II

| Example | mmol cetyl/stearyl alcohol ethoxylate | mmol PEG-8000 | Toluene, grams | mmol NaOH | mmol epichloro- hydrin |
|---------|---------------------------------------|---------------|----------------|-----------|------------------------|
| 3 | 73.1 | 18.2 | 400 | 110 | 79.2 |
| 4 | 70 | 10.5 | 350 | 91 | 73 |
| 5 | 78.8 | 8 | 350 | 105 | 86 |
| 6 | 68.5 | 10.3 | 350 | 98 | 71.3 |
| 7 | 63.7 | 12.8 | 350 | 90 | 64.3 |

Example 8

The water/cosolvent/product mixtures obtained in Examples 2 through 7 were added to contractors' paint in the quantities shown in TABLE III below, and the product viscosities (in cps) and the initial and equilibrium ICI and KU values were measured and are also given in TABLE III.

TABLE III

| Example | Ethoxylated alcohol | % PEG-8000 in product | ECH/OH ratio | Product viscosity² (cps) | lbs mixture in 100 gal paint | Initial ICI/KU | Equilibrium ICI/KU |
|---------|---------------------|-----------------------|--------------|--------------------------|------------------------------|----------------|---------------------|
| 2 | cetyl/stearyl | 25 | 0.72 | 2200 | 6.44 | 0.8/91 | 0.8/93 |
| 3 | cetyl/stearyl | 25 | 0.75 | 1920 | 7.40 | 1.3/98 | 1.1/96 |
| 4 | cetyl/stearyl | 15 | 0.8 | 1880 | 6.35 | 0.7/92 | 0.6/91 |
| 5 | $C_{16}$ Guerbet | 10 | 0.9 | 1500 | 7.29¹ | 1.0/89 | 1.0/89 |
| 6 | $C_{20}$ Guerbet | 10 | 0.85 | 740 | 6.34¹ | 1.0/71 | 1.0/73 |
| 7 | $C_{20}$ Guerbet | 20 | 0.7 | 4200 | 4.99¹ | 0.5/91 | 0.5/90 |

¹extra butyl carbitol added to disperse thickener in paint
²Brookfield viscosity (spindle #3, at 30 r.p.m.)

What is claimed is:

1. The branched reaction product of
   A) a linking compound of formula I $$R^1(X)_3 \quad (I)$$

wherein each X group is a halogen atom or one X group is a halogen atom and two X groups together with two carbon atoms from the $R^1$ group and an oxygen atom form an epoxy group and $R^1$ is an alkanetriyl group containing from 3 to 10 carbon atoms;

B) a compound of formula II $$R^2(OA)_n\text{—OH} \quad (II)$$

wherein $R^2$ is an aliphatic group containing from 4 to 36 carbon atoms, n is a number of from 1 to 200, and each OA group is independently an ethyleneoxy, 1,2-propyleneoxy, or 1,2-butyleneoxy group; and C) a compound of formula III $$H\text{—}(OA)_m\text{—}OH \quad (III)$$

wherein OA is as defined above, and m is a number of from 1 to 500; wherein the ratio of moles of component A) to the sum of the OH equivalents in components B) plus C) is from 0.7:1 to 0.99:1.

2. The product of claim 1 wherein said ratio is from 0.7:1 to 0.9:1.

3. The product of claim 1 wherein component A) is epichlorohydrin.

4. The product of claim 1 wherein component A) is a trichloroalkane.

5. The product of claim 1 wherein in component B) all OA groups are ethyleneoxy groups.

6. The product of claim 1 wherein in component C) all OA groups are ethyleneoxy groups.

7. The product of claim 1 wherein in component B) the $R^2$ group is a straight or branched alkyl group containing from 16 to 20 carbon atoms.

8. The product of claim 5 wherein in component B) the $R^2$ group is a $C_{20}$ Guerbet alkyl group.

9. The product of claim 1 wherein in component B), n is a number of from 80 to 120.

10. The product of claim 9 wherein n is a number of from 80 to 100.

11. The product of claim 1 wherein in component B), the $R^2$ group contains from 12 to 20 carbon atoms.

12. The product of claim 1 wherein in component C), m is a number of from 50 to 500.

13. The product of claim 1 wherein the product is in the form of an aqueous liquid.

14. The product of claim 1 wherein the product is in the form of an aqueous liquid; in component B) the $R^2$ group is a straight or branched alkyl group containing from 16 to 20 carbon atoms and n is a number of from 80 to 120; and in component C) m is a number of from 50 to 500.

15. The product of claim 14 wherein the ratio of moles of A) to the sum of the OH equivalents in B)+C) is in the range of 0.7:1 to 0.9:1.

16. The product of claim 14 wherein component A) is epichlorohydrin.

17. The product of claim 14 wherein in components B) and C) all OA groups are ethyleneoxy groups.

18. The product of claim 17 wherein n is a number of from 80 to 100.

19. The product of claim 1 in the form of an aqueous liquid having a solids content of from about 15 to about 40% by weight.

20. The aqueous liquid of claim 19 wherein the aqueous liquid also contains a glycol ether cosolvent.

21. The product of claim 19 which also contains a surfactant.

22. In an aqueous composition, the improvement wherein a thickening-effective quantity of the reaction product of claim 1 is present therein.

23. In a latex paint, the improvement wherein a thickening-effective quantity of the reaction product of claim 1 is present therein.

24. A process comprising the steps of i) reacting a compound of formula II

$$R^2(OA)_n\text{—OH} \quad (II)$$

wherein $R^2$ is an aliphatic group containing from 4 to 36 carbon atoms, n is a number of from 1 to 200, and each OA group is independently an ethyleneoxy, 1,2-propyleneoxy, or 1,2-butyleneoxy group; and a compound of formula III

$$H\text{—}(OA)_m\text{—OH} \quad (III)$$

wherein OA is as defined above, and m is a number of from 1 to 500, in an organic solvent that azeotropes water, in the presence of an alkali metal alkoxide or hydroxide, and under azetoropic distillation conditions to remove water, to obtain a reaction mixture containing reaction product;

ii) adding to the reaction mixture from step i) a linking compound of formula I

$$R^1(X)_3 \quad (I)$$

wherein each X group is a halogen atom or one X group is a halogen atom and two X groups together with two carbon atoms from the $R^1$ group and an oxygen atom form an epoxy group and $R^1$ is an alkanetriyl group containing from 3 to 10 carbon atoms, and reacting the compound of formula I with the reaction mixture from step i);

iii) removing the organic solvent from the resulting reaction product; and iv) adding water to said reaction product to form an aqueous solution or dispersion having a solids content of from about 15 to about 40% by weight; wherein the ratio of moles of the linking compound of formula (I) to the sum of the OH equivalents in the compound of formula (II) plus the compound of formula (III) is from 0.7:1 to 0.99:1.

25. The process of claim 24 wherein the organic solvent is benzene, toluene, xylene, or mixtures thereof.

26. The process of claim 24 wherein the reaction mixture from step i) contains no more than 0.2% by weight of water.

27. The process of claim 24 wherein step ii) is carried out at a temperature of from about 60° C. to the reflux temperature of the organic solvent.

28. The process of claim 27 wherein said temperature is in the range of from about 100° to about 110° C.

29. The process of claim 24 wherein in step iv the solids content is from about 20 to about 40% by weight.

30. The process of claim 24 wherein a cosolvent is also added to reduce the viscosity of the aqueous solution.

31. The process of claim 30 wherein the cosolvent is a glycol ether.

32. The process of claim 24 wherein a surfactant is added to the aqueous solution from step iv.

33. The process of claim 24 wherein in step iii the organic solvent is removed by vacuum distillation.

34. The process of claim 24 wherein in step i from 1 equivalent to 1.5 equivalents of an alkali metal hydroxide are present per equivalent of hydroxy groups.

35. The product of the process of claim 24.

36. The process of claim 24 wherein said ratio is from 0.7:1 to 0.9:1.

* * * * *